Patented Aug. 2, 1949

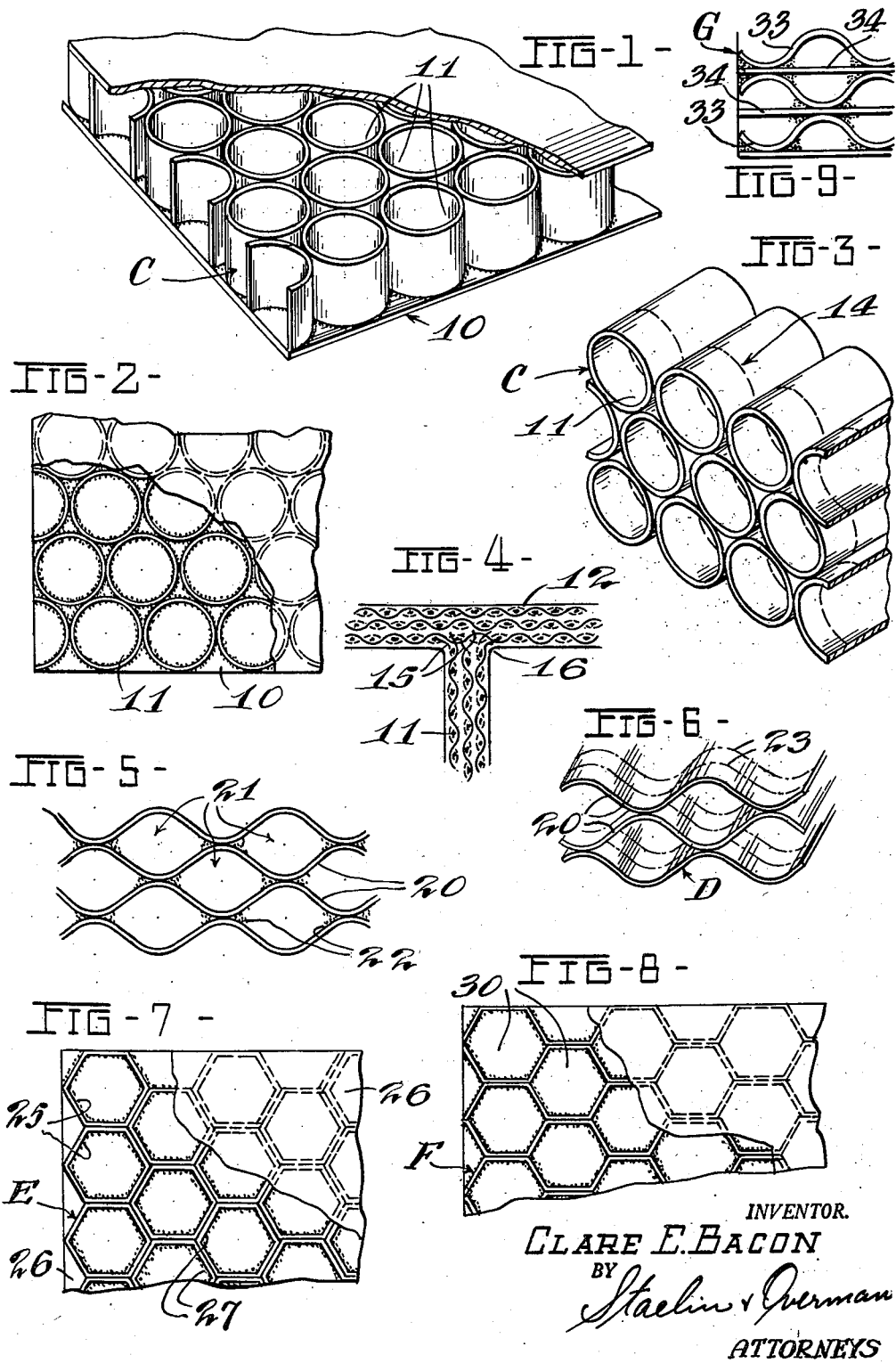

2,477,852

UNITED STATES PATENT OFFICE 2,477,852

STRUCTURAL PANEL CONSTRUCTION

Clare E. Bacon, Newark, Ohio, assignor to Owens-Corning Fiberglas Corporation, a corporation of Delaware Application July 4, 1945, Serial No. 603,117

4 Claims. (Cl. 154—45.9)

The present invention relates to structural members and more particularly to an improved structural panel and wall construction embodying what is commonly known in the art as the sandwich principle of construction.

One of the principal objects of the invention is to provide a structural member or form composed of material that can be built up within a mold and molded into the required shape without the necessity of employing high pressures, high temperatures, or expensive molds.

Another object of the invention is to provide a structural member having light weight combined with high strength and high rigidity. More specifically, the invention contemplates a body or inner structure of light weight material as a core reinforced at opposite sides by a material having high tensile strength.

Another object of the invention is to provide a structural member of reinforced plastics of high strength which may be fabricated from preformed materials in the desired combination in order to obtain maximum strength in selected directions.

A still further object of the invention is to provide a high strength structural material which combines high thermal and acoustical insulating qualities, good damping features, is highly moisture resistant and is economically made.

Other objects and advantages of the invention will become apparent during the course of the following description.

Structural members or panels comprising core structures having surfacing sheets adhered thereto have heretofore been produced in various forms. The most common of such forms includes a corrugated sheet as the core member to which surfacing sheets are adhered. This type of material is adapted for forming flat panels or surfaces curved only along one axis, that is, longitudinally of the corrugations, and can not be used in conical or spherical conformation. This type of material exhibits proportionately great compressive strength in directions axially of the corrugations but is less resistant to compressive stresses in directions normal to said axis. These latter strengths mainly result from the type of material employed. Variations of this structure employ as cores folded sheet material as well as tubular formations of sheet material.

Other forms of cores to which facing sheets are applied include fibrous materials in mat form or other void-filled substances of light density. This type of material while adapted for use on curved surfaces usually requires preforming by molding in a separate operation. Such a core material in one form may be cellular in nature and provide a multiplicity of pores or enclosed spaces such as, for example, foamed rubber or plastic resinous materials, the porous nature of which is the result of chemical reactions as the body is formed.

The present invention provides a core structure produced mechanically from prefabricated members or parts. In this type of construction it is possible to assemble the several components in a manner to offer highest resistance to stresses in the desired areas. It is desirable, of course, in structures of the present type to employ materials having the highest strength combined with light weight. One such material embodying the prerequisite characteristics, I have found, is a resinous plastic material reinforced with glass fibers. The strength of this material may be varied as desired by varying both the type of resin and the form in which the glass fibers are employed. The high tensile strength of glass fibers is best utilized when the fibers are of the continuous type and articles made therefrom retain a high degree of dimensional stability. The manufacture of fibers of this type is disclosed in the patent to Slayter and Thomas #2,133,238.

In fabrics woven entirely from the above class of material the multiplicity of bundles or strands of fine continuous glass fibers extend throughout the length and width of the fabric. Pieces cut from such material therefore, have the fibers extending substantially continuously throughout each dimension so that the greatest ultimate strength is realized. It will be understood that fibers of other types such as cotton or other vegetable fibers or synthetic resinous fibers of rayon, nylon or the like may be combined by intertwisting or interweaving with the glass fibers in the production of a fabric.

Lengths of glass fiber fabric may be impregnated with a suitable resinous material and laminated together to form both curved and flat sheets or other shapes, for instance, tubes, and cured to set the resin. When two or more sheets of fabric are laminated together they may be rotated with respect to one another to dis-orient the direction of the strands in adjacent sheets and thus provide maximum strength in all directions. It has been found that laminates of two or three layers of cloth produce an article of extremely high strength and rigidity when combined in the manner of the present invention although a single ply may be used if desired. It is possible to employ cloths having different weaves, weights, and thicknesses when such combination provides certain desirable characteristics.

For a clearer understanding of the present invention, reference may be had to the accompanying drawings, in which:

Figure 1 is a fragmentary perspective view of a panel formed in accordance with the principles of the invention;

Figure 2 is a sectional plan view of the structure shown in Figure 1;

Figure 3 illustrates one step in the practice of the invention;

Figure 4 is a detail sectional view of the construction shown in Figure 1;

Figure 5 illustrates a modification of the form of the invention shown in Figure 1;

Figure 6 illustrates a step in the practice of the form of the invention shown in Figure 5;

Figure 7 illustrates an alternate form of structure;

Figure 8 illustrates a further modified construction; and

Figure 9 illustrates a still further modification of the invention.

The embodiments of the present invention as illustrated in the drawings are adapted primarily to be used as self-sustaining wall structures for uses such as aeroplane fuselage or wing constructions, the hull construction of life-saving or other small boats or rafts, or other flotation equipment where high strength combined with low weight is an important factor.

The preferred form of the invention illustrated in Figures 1 and 2 of the drawings comprises generally a panel structure 10 in which the core C consists of a plurality of relatively short tubular members 11 adhered together in lateral contact in compact relation. The tubes are cylindrical in cross-section and are of uniform length and diameter, their ends lying in parallel planes. The length of the tubes conforms to the thickness desired in the finished panel and the diameter of the tubes is selected to provide the compressive strength required, a greater number of smaller tubes providing increased strength. Usually the length of the tubes will range from about ¼ inch to 2 inches and the diameter from about ¼ inch to 2 inches. Surfacing sheets 12 are attached to the core member and serve to close the open ends of the tubes 11. Thus a plurality of air tight chambers are provided. These air spaces provide thermal and acoustical insulating qualities in the panel as well as buoyancy. The surfacing sheets further provide increased resistance in the laminate to torsional stresses.

The material from which this and the following examples are constructed provides the high strength qualities of resinous materials known as "plastics" reinforced with glass fibers and the high strength-to-weight ratio of articles formed therefrom.

The production of structures in accordance with the present invention may be accomplished in several ways according to the shape it is desired to fabricate. The tubular core may be fabricated in sections of a size which can be readily handled. This is accomplished by forming the tubes 11 in a suitable manner such as wrapping resin impregnated glass fiber cloth about a mandrel and curing, partially curing or drying it thereon. The tubes are then assembled in compact arrangement in any desired shape, for instance, a rectangular block as shown in Figure 3, and further processed to adhere them together. This may be done by applying adhesive to the tubes, or by a further curing operation when the fibrous material is impregnated with a partially reacted resinous substance.

When the tube diameter is relatively small, say ¼ inch or less, the resin adhesive may substantially fill the spaces between adjacent tubes so that a rigid columnar structure is provided as additional reinforcement for the tubes. This greatly increases the structural strength of the panel by providing regularly spaced reinforced ties between the surface sheets. The block of tubes is then cut as by sawing it into sheets transversely of the axes of the tubes as indicated by broken lines at 14 and thus a rectangular section of the core C is formed. Two or three thicknesses of interwoven cloth of .001 to .010 inch thickness may provide sufficient strength for the tube structure or the tubes may be in the form of knitted or braided tubing or sleeving. When the tubes above mentioned are produced, the wall thickness, diameter, height, and weight, etc. are variable quantities, governed by the use to be made of the structure.

As an alternate method of producing this core structure, the tubes may be cut into cylinders of the desired length and assembled individually on one of the surface sheets. Adhesive is applied to the tubes as they are arranged on the sheet and the amount of adhesive can thus be regulated. This method of fabrication is particularly adaptable for forming small or sharply curved sections.

When substantially flat panels are produced the surfacing sheets 12 may also be prefabricated and later assembled with the core. The sheets are made up of the desired number of plies of cloth impregnated with resin and the resin cured with the sheets in superposed relation.

Resinous material used in the core and also in the surfacing layers is preferably a thermosetting resin of the low pressure setting or forming type. Such types are well known and generally available in the art. They include resinous compounds whose polymerizing group is an allyl group, styrene copolymers, di-allyl phthalate, bi-methacrylate, acrylic base resins, and others. Low pressure phenolic resins, urea formaldehyde, thiourea, melamine formaldehyde, and aniline formaldehyde may also be used as well as high pressure resins of the phenolic, urea, and other types, but the low pressure resins are preferred because structural and other forms may be molded using very little pressure.

Low pressure thermosetting plastics as referred to herein may also include materials formed by adding together or combining one or more low pressure thermosetting resins and one or more thermoplastics. Material of this type possesses the characteristics of thermosetting plastics and reduces any tendency toward brittleness inherent therein.

The above mentioned low pressure resins generally require curing in the absence of air and it is the usual practice to mold articles by what is generally called the bag process in which the structure in a mold is placed within a flexible bag and the air exhausted therefrom. This permits atmospheric pressure to be exerted on the structure as curing heat is applied. Normally pressures of from 10 to 25 pounds per square inch are employed for processing the usual low or contact pressure resins, while some resins can be effectively cured in the absence of pressure. Normal pressures for high pressure curing resins may reach 1000 to 2000 pounds per square inch while even higher pressures have at times been used.

In joining a core section of the present type with the surfacing sheets additional adhesive may be required for joining or cementing the members together. This material may be a heat curing resin impregnating the members. Some resins which may be used for the members are not always suitable adhesives inasmuch as some types of resins are air sensitive, that is, do not cure or set up to the best condition when air is present. To this end, due to the air spaces within the core and the fact that molds cannot be placed therein, the resin adhesive may preferably be a non-air sensitive resin such as any of those now available commercially.

When curved shapes are to be produced from the panel structure just described, the method of fabrication may be somewhat varied. In certain types of structural applications fabrication is best achieved through the use of either a male or female mold depending upon the construction or use to which the article is put. In this method the mold surface is first prepared by applying a "stripping" coat of wax or other film forming substance such as polyvinyl alcohol or cellophane to prevent the resinous material from adhering to the mold surface. The laminating sheets impregnated with resin in an uncured or partially cured or reacted state are then applied on or in the mold until the desired thickness is reached. In this way any number of layers may be applied to increase the strength in localized areas.

The sheets or sections of core material prefabricated as described above are then placed in contact with the laminate already in place. The core sheet while normally sufficiently flexible and yielding to fit curved surfaces, may be cut into suitably shaped sections to facilitate assembly on a curved surface. Additional adhesive may be applied to the attaching surfaces of the core, that is, the end faces of the assembled tubes, to assure thorough sealing at the intersections. When the core is in place the outer surface laminate is then applied following the procedure of placing the first surface sheet. A protective coating or material such as cellophane is then placed over the laminate and the molding bag placed thereover. Air is exhausted from the bag and curing heat as indicated by the particular resin employed, usually about 185 to 240° F., is applied. By this process large sections, panels, or other structures may be produced.

While both the core and surfacing sheets have considerable flexibility alone, the combination results in achieving a high degree of strength and rigidity, particularly resistance to compressive stresses.

In core sections in which the cell walls are very thin only a narrow edge is thus presented for adhesion to the surface sheet and I have found that a greater bonding surface is advantageous in most applications. Adhesion between the core and surface sheets is increased as a result of severing the core sheets from the main body of material as shown in Figure 3. As the sheets of tubular members 11 are sawed or otherwise cut, the side edges of the sheet tend to fray out at the kerf exposing the raw fiber ends. This also causes the removal of a small amount of the resin adjacent the margin of the cut so that the fibers are permitted a limited free movement.

Although the individual glass filaments making up the twisted strands from which the fabric is woven are extremely small and flexible when alone and unsupported, they acquire considerable stiffness when gathered into a strand and coated with resin. In the present circumstances the ends of the severed strands, supported as they are, both by the weave of the cloth and by reason of the impregnating resin, present a relatively rigid body. The twist resulting from plying and twisting operations through which the glass fibers pass before being woven into cloth place the fibers in a substantially spiral formation within the strands. Thus it will be understood that each strand exposed as the core sheet is severed from the main body of assembled tubes comprises a multiplicity of fibers which extend in random directions. There is a great probability that all of the projecting individual fibers will not extend in a uniform pattern but will be grouped sometimes in substantial numbers.

These fibers which extend in the plane of the tube walls engage the surface of the facing fabric when the core and fabric are assembled with the result that the stiff fibers tend to penetrate the fabric. This is especially true when the resin impregnant in the fabrics is in a softened condition due to its being partially cured or to its softening during curing when heat is applied. Fibers not penetrating the panel are flared outwardly along its surface. This is illustrated in detail on a greatly enlarged scale in Figure 4 at 15.

This spreading of the fibers not only provides an increased surface area for attachment but the individual fibers serve to reinforce the body of adhesive which takes the form of a meniscus or fillet 16 at the wall juncture. This feature is multiplied many times throughout the structure and assures permanent adhesion of increased strength between the members.

The generally tubular core structure of the preferred embodiment of the invention is substantially duplicated in the form of the invention shown in Figures 5 and 6. In this form the core member D (Figure 5) comprises a plurality of strips 20 corrugated transversely of their length and arranged in staggered relation with the high and low points of adjacent strips in contact, whereby substantially oval spaces 21 are formed. The resinous adhesive material applied to the strips at the points of contact 22 provides a rigid reinforcement for the core and also increases the compressive resistance of the panel.

The core sheets D are readily fabricated by curing or partially curing individually corrugated sheets of resin impregnated fabric of suitable length and assembling them by stacking in staggered relation as shown in Figure 6. Additional resin may be applied along the ridges of the corrugations of the sheets as they are assembled to assure complete adhesion as curing heat and pressure are applied to the form. Only sufficient pressure is required to maintain mutual contact between the sheets without substantially deforming the sheets. The sheets D of the desired thickness are then cut transversely from the stack as indicated by the broken lines 23 in Figure 6. This operation is similar to that previously described in connection with Figure 3.

As an alternate method of assembling core structures from the corrugated sheet material, transversely cut strips severed from previously corrugated sheets may be assembled on edge individually on the facing sheet. These ribbon-like strips can be arranged in any desired formation or as a duplication of the core structure D. Panels or cores produced in this manner may be cured as a unit together with the surface sheets. In these forms the strips forming the core extend substantially continuously through the body and reduce the number of points of adhesion (as compared with individual cells) with a consequent reduction in the amount of adhesive material required.

The form of the invention shown in Figure 7 varies only from that of the preferred embodiment in the shape of the elements comprising the core. In this modification the core E comprises hexagonally shaped tubes 25 adhered together at each side with a resinous adhesive.

Hexagonally shaped tubes may be formed by wrapping a shaped mandrel of the desired size with resin impregnated cloth or tape and curing or drying to retain its form, or cylindrical tubes may be pressed into shape while softened and then cured or dried. The tubes may be assembled in groups or blocks and cut transversely of their length into sheets of the desired thickness in accordance with the previous description relating to Figure 3. Surfacing sheets 26 may then be adhered to the core.

One feature or advantage in this construction not present in the preferred form lies in the fact that each inner cell 27 of the honeycomb-like structure is separated by a wall of double thickness. This increases the compressive strength over that obtained by the single walled tube and produces a stronger panel construction by providing a continuous network of reinforcement therein.

A further modification of the invention is shown in Figure 8 of the drawings. In this form the core structure F is produced by creasing resin-impregnated sheets and curing them in a manner whereby when two of such sheets are placed together in offset relation with alternate nodes and depressions in contact hexagonal cells 30 are formed. In practice, large sheets may be fabricated in this manner and stacked in proper relation in which position they are adhered together. A block of such material is then severed into sheets to provide the core members E in the manner previously described.

While this construction does not provide a double wall thickness at each side of the cell, nevertheless a uniformly spaced series of additionally reinforced areas are provided where the bent strips are joined together. This is substantially similar to the reinforcing pattern of the form of the invention shown in Figure 5. The size of the cells in this as well as the other forms of the invention may be varied to suit the type of construction and strength features as desired.

In Figure 9 the core structure G is shown as a modification of the form of the invention illustrated in Figure 5. It embodies a construction in which corrugated strips 33, arranged on edge, are separated by single uncorrugated strips 34 of the same or other material as desired and which are mutually bonded together at their points of contact. The strips 34 not only provide for increased reinforcement of the panel against compression but improve the tensile strength thereof lengthwise of the strips.

It may be pointed out again that the showing in Figure 4 is typical of the manner of adhesion of the parts in each form of the invention. The resins have a normal tendency to gather or collect at surface intersections and the flaring fiber ends further tend to produce a broadened area of adhesion.

Modifications may be resorted to without departing from the spirit of the invention or the scope of the appended claims.

I claim:

1. A structural member comprising parallelly spaced panels of a thermosetting resinous material reinforced with a glass fiber fabric in which the fibers extend throughout the length of the panel, a core structure between said panels comprising narrow widths of reinforced resinous material bent and assembled edgewise to the panel, said material having frayed edges of exposed fibers substantially free of impregnant to provide increased sealing contact with and penetration into said panels, and a thermosetting resinous adhesive impregnating and bonding the core and panels together.

2. In a reinforced structural member comprising a surface panel of woven glass fiber fabric impregnated with a thermosetting resin, a panel reinforcing structure formed of resin impregnated glass fiber fabric in sheet form arranged in edgewise relation to said panel, said sheets having their edges freed of impregnant to expose the end portions of the glass fibers therein and thus insure substantial intimate interlaced contact with the fabric in the surface panel when said structure and panel are joined together, and a thermosetting adhesive material bonding said panel and structure together.

3. In a reinforced structural member comprising a surface panel of woven glass fiber fabric impregnated with a thermosetting resin, a rigid panel reinforcing structure formed of resin impregnated glass fiber fabric in sheet form arranged in edgewise relation to said panel, said sheets having their edges roughened and free of impregnant to expose the end portions of the glass fibers therein whereby pressure and heat applied to said panel and reinforcing structure to cure the resinous impregnant produces both a substantial flaring out of some of said exposed fibers and penetration of the panel by others of said fibers, and a bonding material coating said fibers and adjacent surfaces and forming a permanent bond reinforced by said flared fibers.

4. A structural member formed of originally deformable material comprising parallelly spaced panels each of a thermosetting resinous material reinforced with glass fiber fabric in which the fibers extend throughout a major dimension of the panel, a core structure between said panels comprising deformed narrow widths of glass fiber fabric impregnated with a resinous material and assembled edgewise to the panel, said narrow widths of material having edges substantially free of impregnant to expose the fibers thereof for increasing sealing contact with and penetration into said panels, and a thermosetting resinous adhesive impregnating and bonding the core and panels together.

CLARE E. BACON.

REFERENCES CITED

The following references are of record in the file of this patent:

UNITED STATES PATENTS

| Number | Name | Date |
|---|---|---|
| 412,507 | Hurford | Oct. 8, 1889 |
| 1,296,359 | Brown | Mar. 4, 1919 |
| 1,469,220 | Kemp | Oct. 2, 1923 |
| 1,903,823 | Lougheed | Apr. 18, 1933 |
| 2,029,214 | Atwood | Jan. 28, 1936 |
| 2,285,679 | Pontius | June 9, 1942 |
| 2,369,006 | Banks | Feb. 6, 1945 |
| 2,414,125 | Rheinfrank | Jan 14, 1947 |

FOREIGN PATENTS

| Number | Country | Date |
|---|---|---|
| 13,287 | Great Britain | 1912 |
| 62,448 | Norway | May 6, 1940 |

OTHER REFERENCES

A. P. C. application of Dornier, Serial Number 212,075, published May 11, 1943.

"The Architectural Forum" of Nov. 1942, page 116 (copy in Div. 20).